Sept. 15, 1925. 1,554,011
E. G. LEHMAN
RACK SHELVING
Filed Aug. 12, 1920    6 Sheets-Sheet 4
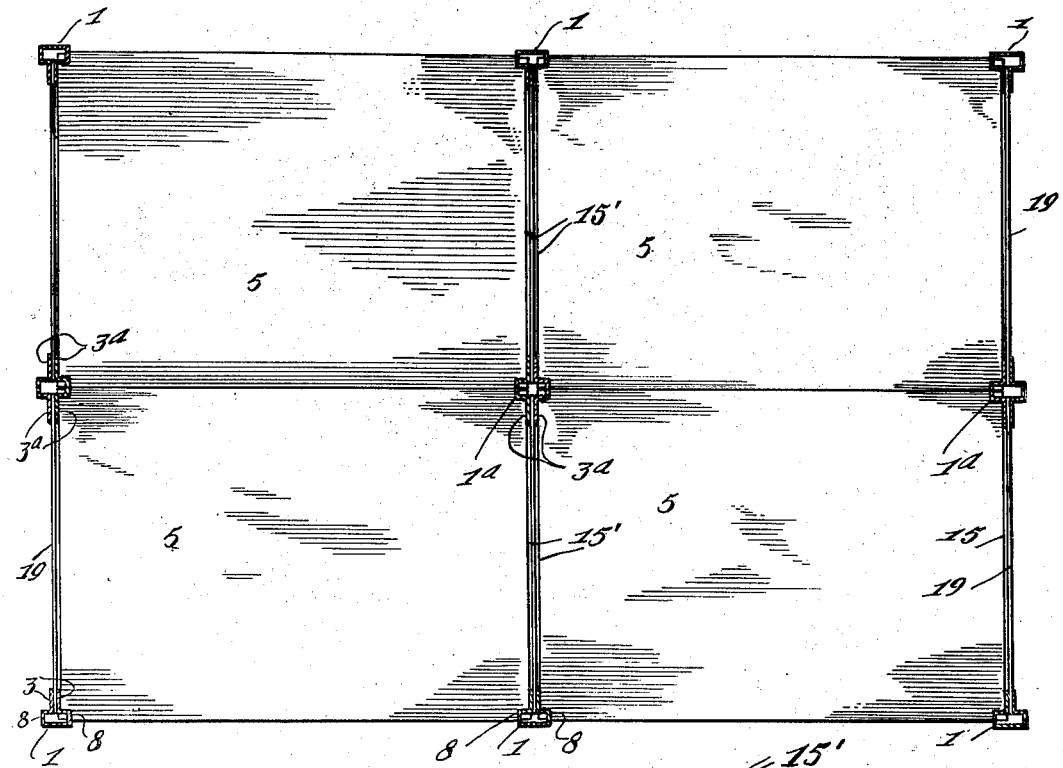
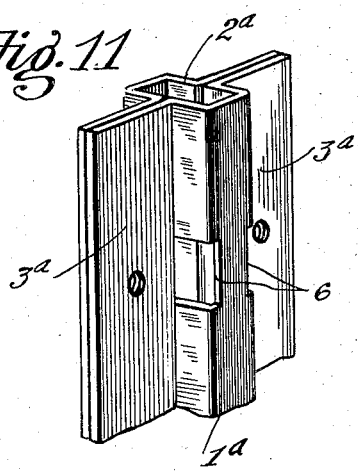
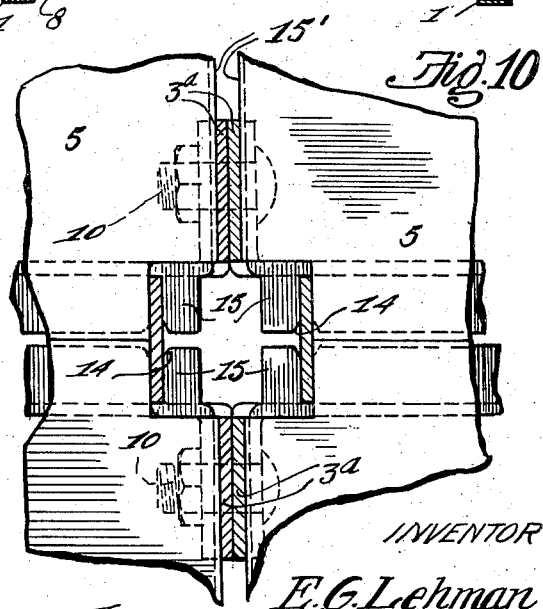
INVENTOR
E.G. Lehman
BY Frease, Merkel, Saywell and Bond
ATTYS.

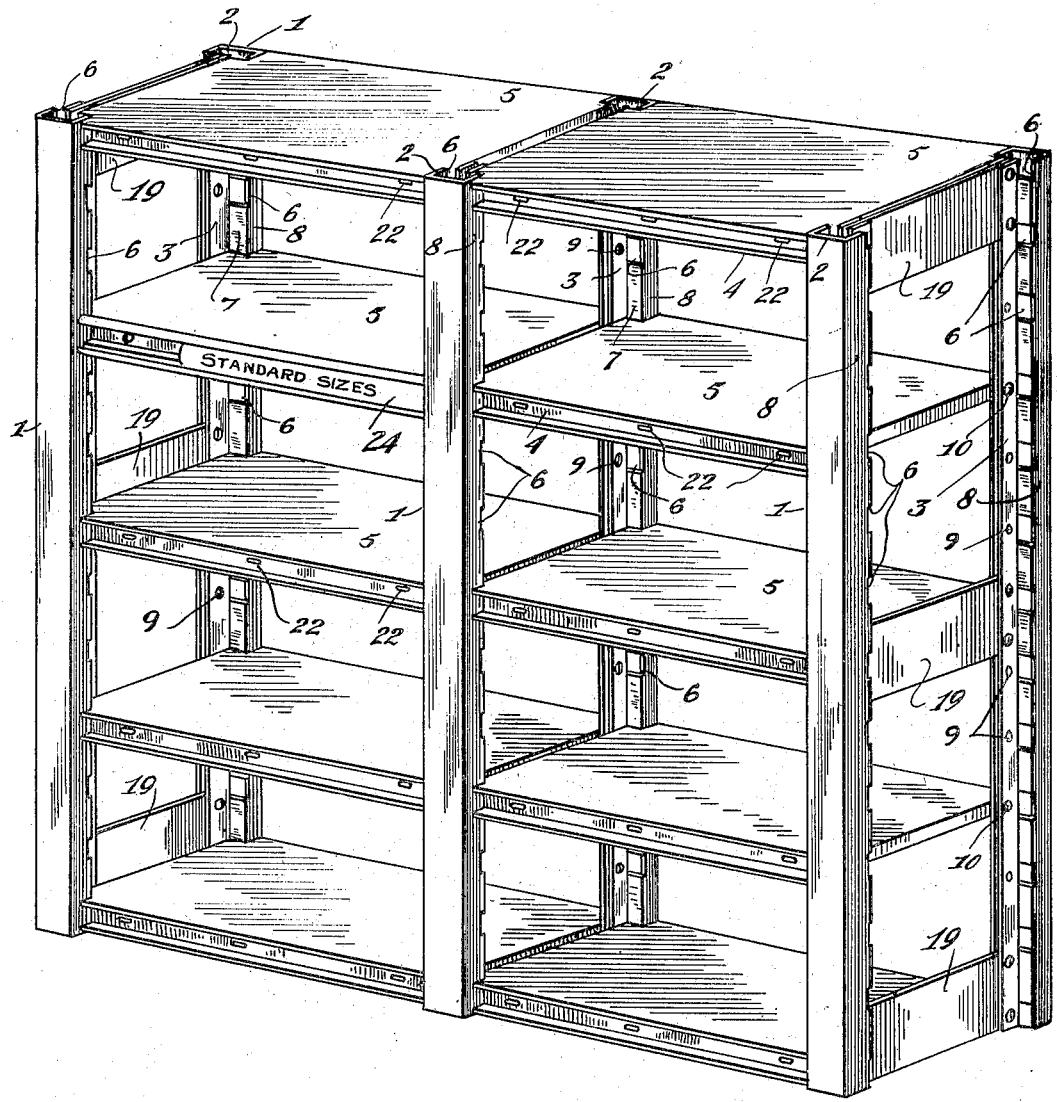

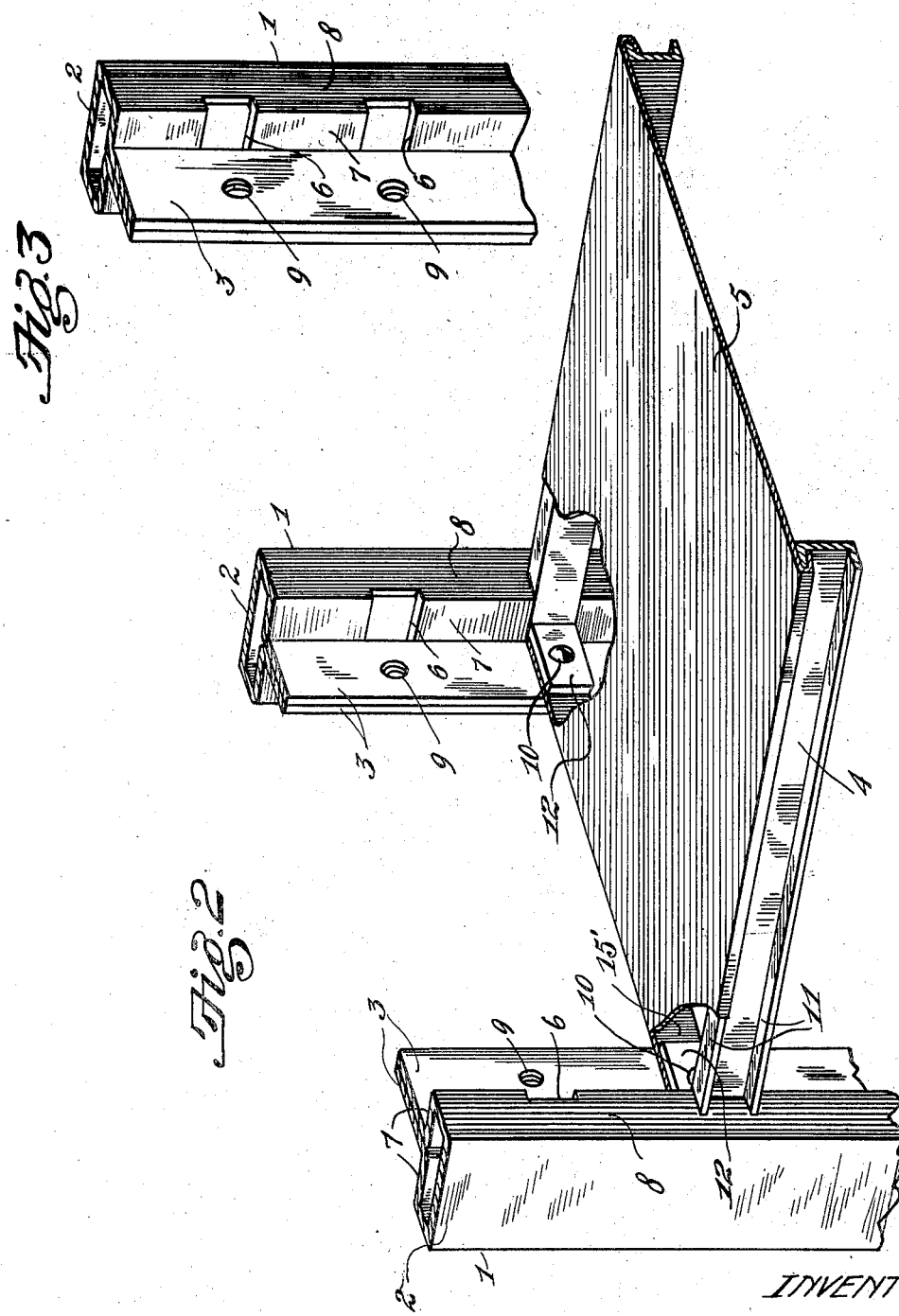

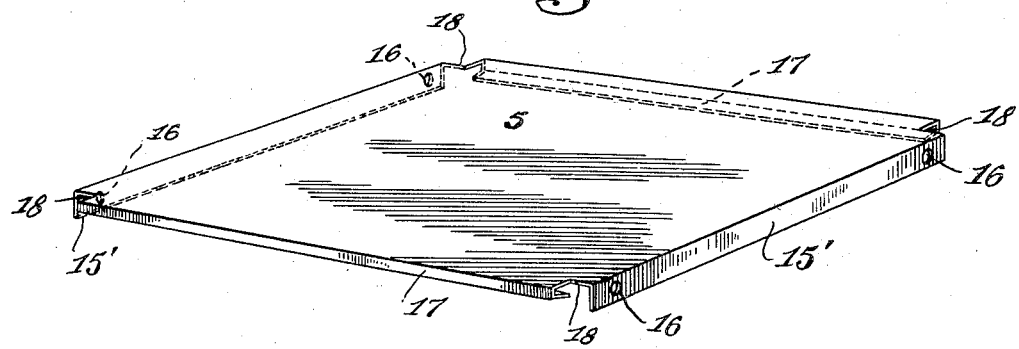
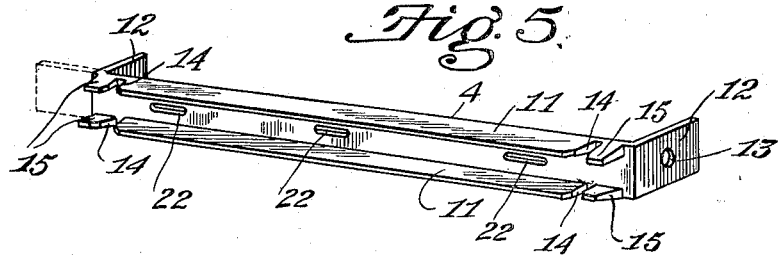
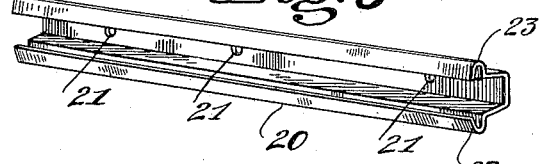
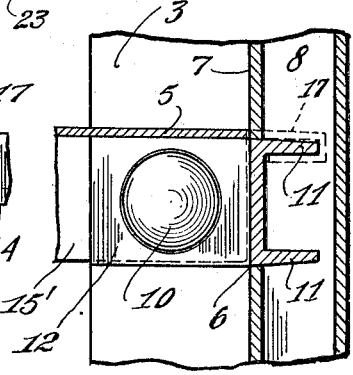
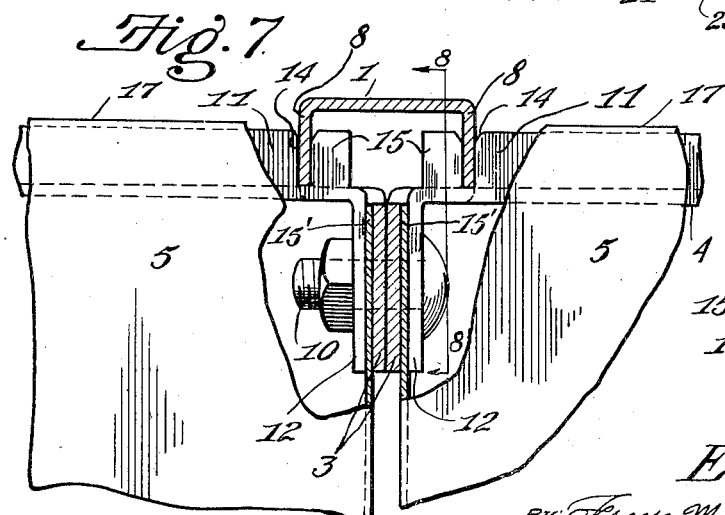

Sept. 15, 1925.                    1,554,011
E. G. LEHMAN
RACK SHELVING
Filed Aug. 12, 1920     6 Sheets-Sheet 5

INVENTOR
E.G.Lehman.

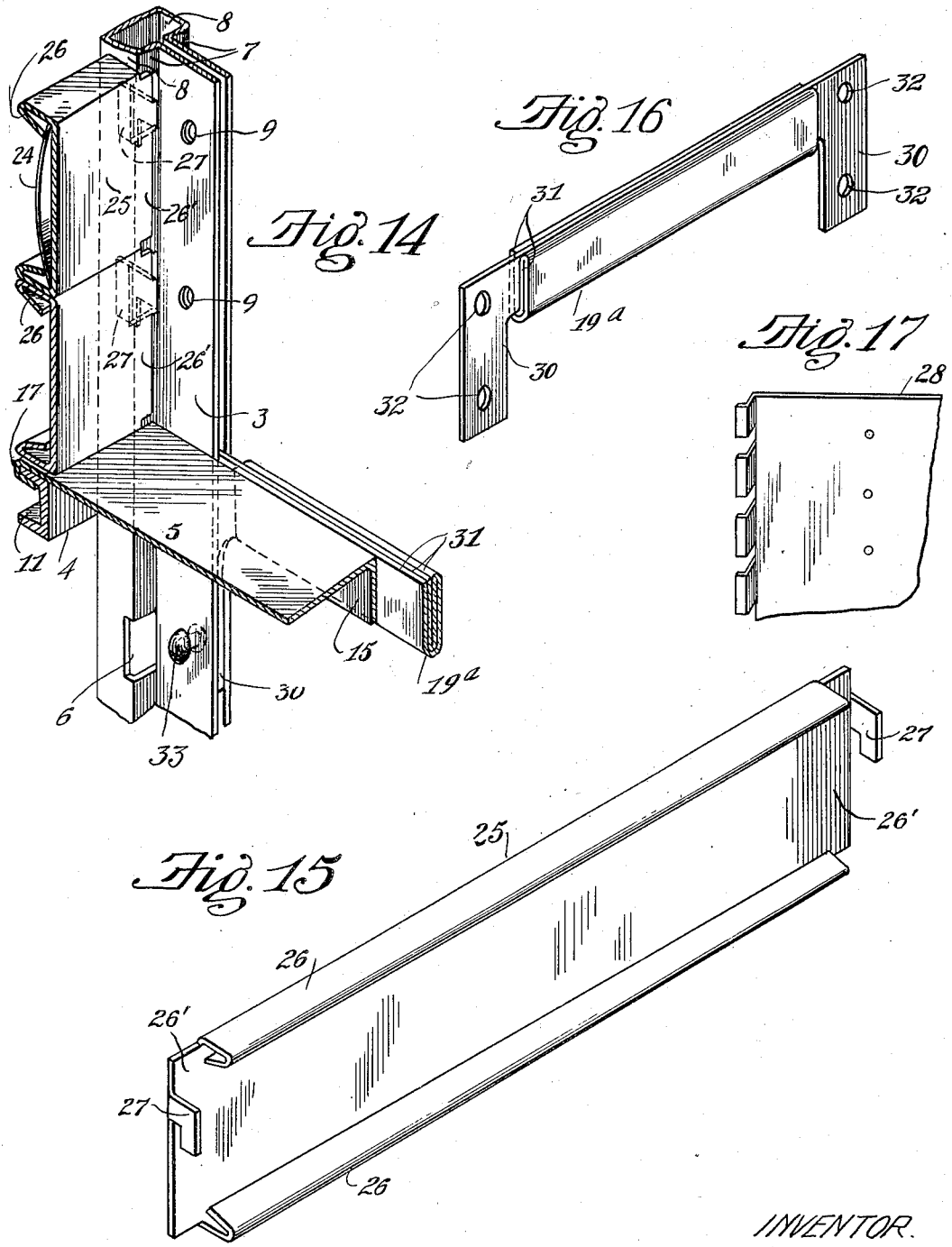

Patented Sept. 15, 1925.

1,554,011

UNITED STATES PATENT OFFICE.

EDWARD G. LEHMAN, OF CANTON, OHIO.

RACK SHELVING.

Application filed August 12, 1920. Serial No. 402,987.

*To all whom it may concern:*

Be it known that I, EDWARD G. LEHMAN, a citizen of the United States, residing at Canton, in the county of Stark and State of Ohio, have invented certain new and useful Improvements in Rack Shelving, of which the following is a specification.

The invention relates to metal shelving, and more particularly to the construction of rack shelving adapted for use in shops, factories, warehouses and other places for storing materials in an accessible manner; and the objects of the invention are to simplify the construction of such shelving, to make and join the members thereof in such a manner that they can be knocked down for shipping and readily reassembled, and to join the frame members in such a manner as to give strength and rigidity to withstand the strains and stresses of use.

The objects of the invention thus set forth in general terms, are attained by the construction and arrangement illustrated in the accompanying drawings, forming part hereof, in which—

Figure 12:
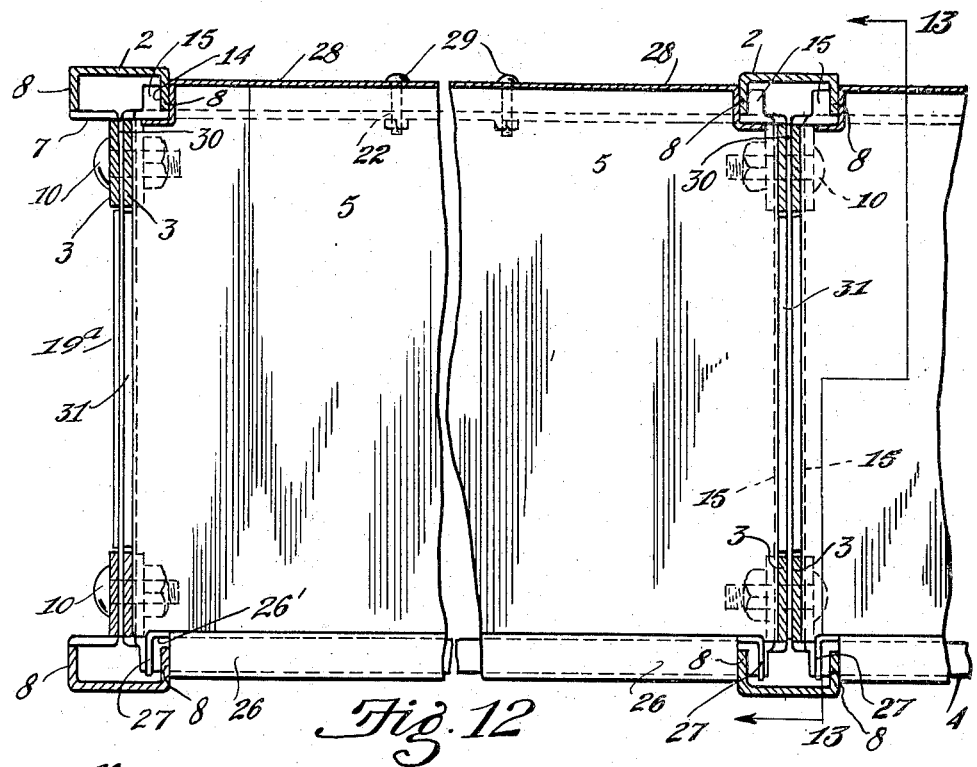
Figure 13:
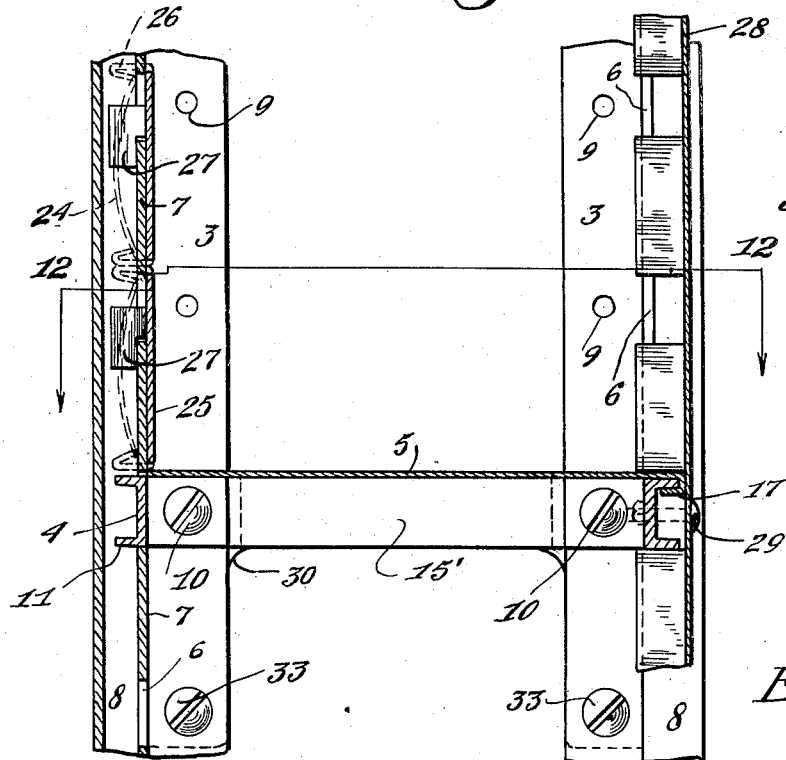

Figure 1 is a perspective view of metal shelving embodying the invention;

Fig. 2, an enlarged fragmentary perspective view of two upright members, two rack bars and a shelf thereon, partly broken away to show details of construction;

Fig. 3, a fragmentary perspective view of an upright member;

Fig. 4, a detached perspective view of a shelf;

Fig. 5, a detached perspective view of a rack bar;

Fig. 6, a detached perspective view of a card holder;

Fig. 7, a fragmentary plan section through an upright member and adjacent parts;

Fig. 8, a fragmentary section on line 8—8, Fig. 7;

Fig. 9, a plan view of a double rack construction with an intermediate row of uprights;

Fig. 10, an enlarged plan section of one intermediate upright and adjoining parts;

Fig. 11, a fragmentary perspective view of an intermediate upright;

Fig. 12, a fragmentary plan section on line 12—12, Fig. 13; showing the use of back and front plates and a modified form of brace plate, to form a bin;

Fig. 13, an elevation section on line 13—13, Fig. 12;

Fig. 14, a fragmentary perspective view, showing details of the front bin plates and the modified brace plate;

Fig. 15, a detached perspective view of a front bin plate;

Fig. 16, a detached perspective view of a modified brace plate; and

Fig. 17, a fragmentary perspective view of a back bin plate.

Similar numerals refer to similar parts throughout the drawings.

The shelf frame involved in this invention is made of upright members 1 made of sheet metal shaped along longitudinal lines to form a T-section with a hollow rectangular head 2, and parallel flanges 3 forming a stem extending inward from the middle of one side; which upright members are connected lengthwise of the frame by longitudinal channel bar members 4 upon which rest the sheet metal shelf plates 5.

A series of rectangular recesses 6 are cut in the inner wall 7 of the T-head of the upright members on each side of the stem flanges thereof, which recesses extend to and include that portion of the side walls 8 of the T-head equal to the thickness of the inner wall 7 thereof; and the stem flanges 3 of the upright members are provided with a corresponding series of apertures 9 for receiving the shanks of the bolts 10 employed in connecting the frame members together.

The flanges 11 of the channel bar frame members 4 are cut away at each end and the protruding web portion is bent backward at right angles to form an abutment plate 12 which is provided with a bolt aperture 13; and slots 14 are also cut in the flanges of the channel bars 4 to form the tongues 15 at each end thereof, which tongues are adapted to be entered through the recesses 6 in the walls 7 of the upright members by engaging the slots 14 of the channel bar flanges with the side walls 8 of the upright.

The tongues 15 are preferably bent or deflected slightly toward each other so as to more readily enter between the upper and lower edges of the recess 7, and the parts are so proportioned that when the tongues are entered in a recess, the inclined faces of the tongues will wedge against the upper and lower edges of the recess; and the mouths of the slots 14 are preferably beveled so as to facilitate the entrance and engagement of the end wall 8 of the upright therein, the parts being so proportioned that when the walls 8 are entered in the slots they will completely fill the same and fit firmly therein.

The shelf plates 5 are shaped to form the downturned flanges 15' at each end, which flanges are adapted to enter between the stem flanges 3 of the upright members and the abutment plates 12 of the longitudinal bars 4 when the tongues thereon are entered in the recesses of the upright members, and apertures 16 are provided in these shelf flanges to receive the bolts 10 when all the parts are assembled.

The side edges of the shelf plates 5 are shaped to form the inturned flanges 17, which flanges are adapted to fit neatly around the upper flanges of the longitudinal channel bars, and the corners of the shelves are cut away at 18 to fit around the T-head of the upright members.

It is evident that all the parts may be readily assembled by placing a shelf plate upon two longitudinal channel bars and positioning these bars at an interval inside their final location, whereupon the ends of these bars, with the shelf plate thereon, are placed inside the recesses in the inner walls of the T-head of the upright members, after which the bars are moved outward so that the tongues on their ends will enter the recesses in the manner described and the upper flanges of the channel bars will engage the inturned flanges on the sides of the shelf plates, in which position the parts may be secured by inserting the connecting bolts 10 through the apertures provided therefor.

In addition to the wedging of the tongues 15 against the edges of the recesses 6, and the fitting of the side walls 8 of the T-head in the slots 14 in the flanges of the channel bars, the web portion of the channel bar is located in the same plane with the inner wall 7 with the T-head of the upright member, and the abutting edges of these parts increases the rigidity of the joint made by the wedging and interlocking of the tongues and slots with the walls of the upright members.

A number of brace plates 19 may be inserted and bolted between the stem flanges of the upright members, if desired, to stiffen the frame against transverse strains and to serve as the end wall of a bin; and a label holder 20 may be secured in the channel bars 4 by means of bolts passed through apertures 21 in the label holder, and slots 22 in the web of the channel bar, the label holder being provided with groove forming the flanges 23 in which may be entered a name label 24 as shown in Fig. 1.

An upright 1ᵃ may be employed for use intermediate the sides of the shelving to increase the depth or the strength thereof, which intermediate member is made with stem flanges 3ᵃ extending both ways from the rectangular hollow head or body portion 2ᵃ thereof, and rectangular recesses 6 are provided in both walls alongside the stem flanges as shown in Fig. 11, to which intermediate upright members, the longitudinal bars and the shelf sheets, are connected and secured the same as to the ordinary upright members.

The rack shelving can be made into bins by using the front and back plates shown in Figs. 12 to 15 and 17, and the bins may extend continuously from end to end of the shelves, by using the modified brace plate shown in Fig. 16.

The front plates 25 are shaped as channels with inturned flanges 26, which flanges are cut away at the ends to abut the side walls 8 of the upright members, and the protruding ends 26' of the web portion extend behind the inner walls 7 of the upright members and are cut and bent to form the flange hooks 27 which engage said inner walls by passing through recesses 6 therein.

The series of recesses 6 are preferably spaced about three inches apart so as to permit an adjustment of the height of the shelves, and the front plates 25 may be made three inches wide, or any multiple thereof, and as many front plates may be used one above the other as may be necessary to give the desired height to the front wall of the bin. The inturned flanges of the front plate may be utilized as a holder for a name label 24, in lieu of the separate label holder 20.

The back plates 28 are shaped with outturned L-flanges on their ends for abutting the side walls 8 and engaging behind the inner walls 7 of the upright members; and these flanges are notched every three inches to correspond to the recesses 6 in the upright members, so as to accommodate the longitudinal channel bars 4 wherever they may be located, which permits the back plate to extend the entire height of the frame. Bolts 29 may be used for securing the back plate to the longitudinal channel bars intermediate their ends by passing their shanks through the slots 22 therein.

The modified brace plates 19ᵃ have their middle portion cut from the end portion 30, and bent upon itself to form a plurality of folds 31 on one or both sides of the plate, thus forming a laminated brace bar of the same depth as the channel bars 4 with the shelf plate thereon; and these brace bars are preferably located in the plane of the channel bars and fill the space between the end flanges 15 of the shelf plates, without obstructing the opening between adjacent shelves.

The end portion 30 of the modified brace plates, are of such vertical depth as to provide for at least two apertures 32 corresponding to the like series of apertures 9 in the stem flange of the upright members, between which flanges the end portions of the brace plates are secured by bolts 33 passed through said apertures.

In this manner, the rack shelving can be converted into a series of bins, without any change in the frame or shelf members thereof; and it is evident that the bin members serve to brace and strengthen the same.

I claim:—

1. A shelf frame including upright members having a rectangular section with a hollow body and stem flanges, there being rectangular recesses in the walls of the body alongside the stem flanges, and a channel bar having an abutment plate on its end and tongues and slots in its flanges, said tongues having inclined faces for wedging in a recess and interengaging with the walls of the upright members.

2. A shelf frame including upright members having a rectangular section with a hollow body and stem flanges, there being rectangular recesses in the inner wall of the body alongside the stem flanges, and a longitudinal flanged bar having an abutment plate on its end and a tongue and a slot in its flanges for entering a recess and interlocking with the walls of the upright member, and a shelf plate having a downturned flange entered between the abutment plate on the flanged bar and a stem flange of the upright member.

3. A shelf frame including upright members having a rectangular section with a hollow body and stem flanges, there being rectangular recesses in the inner wall of the body alongside the stem flanges, and a longitudinal flanged bar having an abutment plate on its end and a tongue and a slot in its flanges for entering a recess and interlocking with the walls of the upright member, and a shelf plate having a downturned flange entered between the abutment plate on the flanged bar and the stem flanges of the upright member, and having an inturned flange for engaging the upper flange of the longitudinal bar.

4. A shelf frame including an upright member of T-cross section having recesses in its rear walls, a longitudinal bar with a shelf plate thereon connected with the upright member, and a front plate provided with outwardly extending flanges at the top and bottom said flanges being cut to abut the sides of the upright member and a flange hook on its protruding end for engaging in a recess of the upright member.

EDWARD G. LEHMAN.